(12) United States Patent
Carter

(10) Patent No.: US 10,173,466 B2
(45) Date of Patent: Jan. 8, 2019

(54) WHEEL AXLE ASSEMBLY WITH STABILIZING BRACES

(71) Applicant: Mark C. Carter, Norco, CA (US)

(72) Inventor: Mark C. Carter, Norco, CA (US)

( * ) Notice: Subject to any disclaimer, the term of this patent is extended or adjusted under 35 U.S.C. 154(b) by 0 days.

(21) Appl. No.: 15/885,801

(22) Filed: Jan. 31, 2018

(65) Prior Publication Data

US 2018/0162164 A1 Jun. 14, 2018

Related U.S. Application Data

(60) Continuation-in-part of application No. 15/658,318, filed on Jul. 24, 2017, now Pat. No. 10,052,915, which is a division of application No. 14/746,478, filed on Jun. 22, 2015, now Pat. No. 9,834,037.

(60) Provisional application No. 62/453,480, filed on Feb. 1, 2017.

(51) Int. Cl.

| B60B 3/00 | (2006.01) |
|---|---|
| B60B 35/02 | (2006.01) |
| B60B 35/04 | (2006.01) |
| B62B 1/18 | (2006.01) |
| B62B 1/00 | (2006.01) |
| B62B 1/26 | (2006.01) |
| B60B 37/10 | (2006.01) |
| B60B 7/06 | (2006.01) |
| B60B 7/00 | (2006.01) |
| B60B 35/00 | (2006.01) |

(52) U.S. Cl.
CPC .............. *B60B 35/025* (2013.01); *B60B 3/00* (2013.01); *B60B 3/001* (2013.01); *B60B 7/00* (2013.01); *B60B 7/0013* (2013.01); *B60B 7/06* (2013.01); *B60B 35/02* (2013.01); *B60B 35/04* (2013.01); *B60B 37/10* (2013.01); *B62B 1/00* (2013.01); *B62B 1/008* (2013.01); *B62B 1/18* (2013.01); *B62B 1/26* (2013.01); *B60B 35/00* (2013.01); *B60B 35/006* (2013.01); *B60B 2200/43* (2013.01)

(58) Field of Classification Search
None
See application file for complete search history.

(56) References Cited

U.S. PATENT DOCUMENTS

| 2,601,994 | A | * | 7/1952 | Richman | ................... B62H 1/12 |
|---|---|---|---|---|---|
| | | | | | 280/304 |
| 2,704,673 | A | * | 3/1955 | Bower | ................... A01G 20/30 |
| | | | | | 280/47.19 |
| 2002/0101065 | A1 | * | 8/2002 | McCollum | ......... A63B 71/0036 |
| | | | | | 280/655 |
| 2013/0334797 | A1 | * | 12/2013 | Umbro | .................... B62B 1/042 |
| | | | | | 280/654 |
| 2016/0368320 | A1 | * | 12/2016 | Carter | ................... B60B 7/0013 |

* cited by examiner

*Primary Examiner* — John D Walters
*Assistant Examiner* — Hilary L Johns
(74) *Attorney, Agent, or Firm* — Seyfarth Shaw LLP

(57) ABSTRACT

A releasable wheel assembly is presented. The releasable wheel assembly includes a base plate and a bracket coupled to the base plate. The bracket includes multiple bosses and each boss includes a hole. An axle passing through the hole of each boss. The axle includes a circumferential groove adjacent to each end of the axle. Additionally, a brace is coupled to the base plate and the axle.

20 Claims, 13 Drawing Sheets

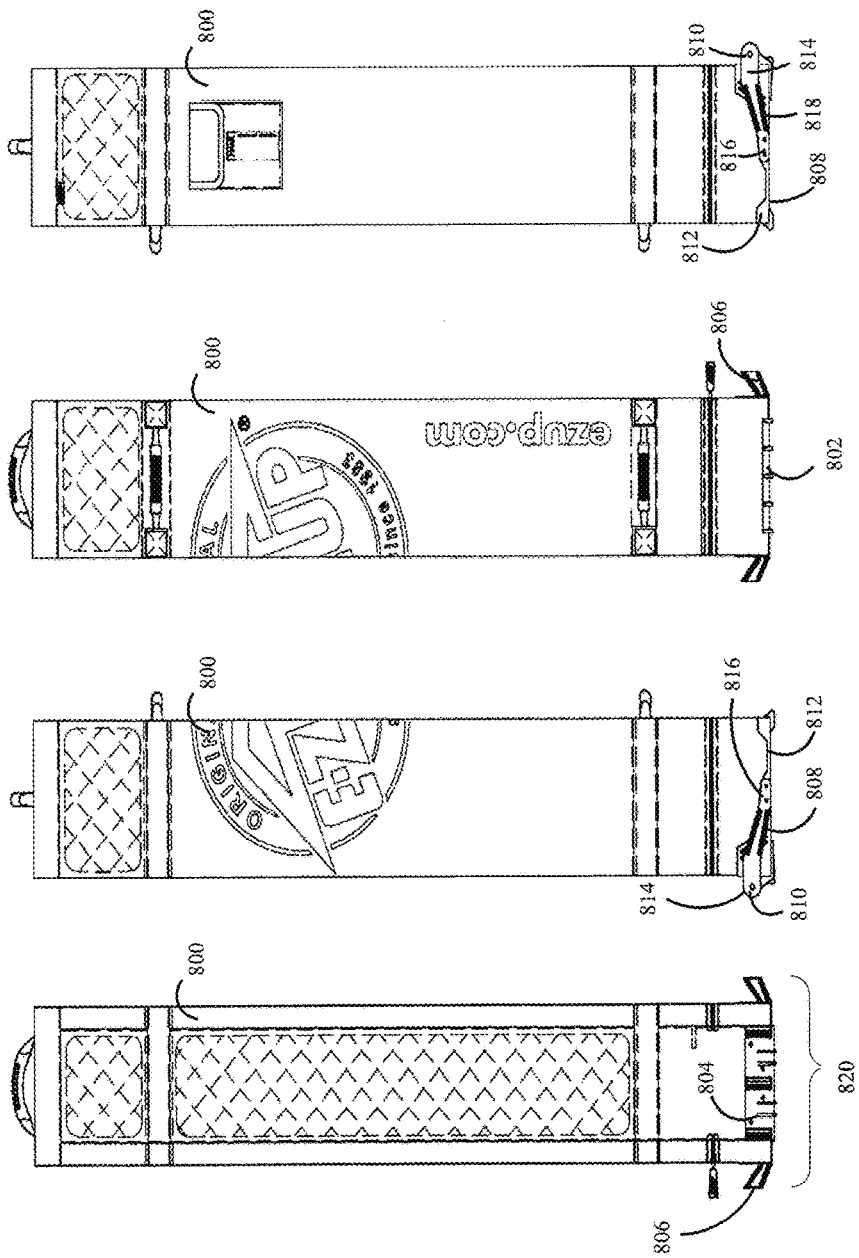

WHEEL AXLE ASSEMBLY WITH STABILIZING BRACES

CROSS-REFERENCE TO RELATED APPLICATION

The present application claims the benefit of U.S. Provisional Patent Application No. 62/453,480, filed on Feb. 1, 2017, and titled "WHEEL AXLE ASSEMBLY WITH STABILIZING BRACES," and the present application is also a continuation-in-part of U.S. patent application Ser. No. 15/658,318, filed on Jul. 24, 2017, and titled "WHEEL AXLE ASSEMBLY, which is a divisional of U.S. patent application Ser. No. 14/746,478, filed on Jun. 22, 2015, now U.S. Pat. No. 9,834,037, and titled "WHEEL AXLE ASSEMBLY," the disclosures of which are expressly incorporated by reference herein in their entireties.

BACKGROUND

Field

Certain aspects of the present disclosure generally relate to wheel axle assemblies, and more particularly to a wheel assembly for moving objects over a terrain with additional support for a removable wheel.

Background

Collapsible shelters may be used in various locations, such as parks, beaches, athletic events, and farmer's markets. In most cases, a collapsible shelter is used to create a covered environment. Collapsible shelters may be collapsed into a compact configuration for transportation. The ease in which these shelters expand and contract has led to widespread commercial success. Still, these shelters are relatively heavy and difficult to transport. For this reason, a carry case with handles is typically provided to improve the transportation of the shelter. In light of the weight factor, however, it may be preferable to roll the carrying case rather than carrying the carrying case.

Conventional carrying cases are equipped with small (approximately one inch) wheels that are permanently attached to the carrying case. The small wheels allow the encased shelter (e.g., the shelter encased in the carrying case) to roll along a smooth flat surface. An issue arises, however, when the encased shelter navigates an irregular terrain, such as sand or uneven pavement. A top heavy carry case can become unstable, making it difficult to roll the shelter. Moreover, the permanent wheels cannot be exchanged for different wheels, such as wheels with a larger diameter, if the terrain or conditions suggest a different set.

It is desirable for carrying cases to include an exchangeable wheel assembly that promotes movement over a variety of surfaces and terrains, and which can be easily removed when desired such that the unit may be stacked or be stored without the wheel assembly while further permitting the facile change of one set of wheels for another. Furthermore, it is desirable to add additional stability to the wheel design to improve the locomotion of the carrying case.

SUMMARY

In one aspect of the present disclosure, a releasable wheel assembly is disclosed. The releasable wheel assembly includes a base plate. The releasable wheel assembly also includes a bracket coupled to the base plate. The bracket includes multiple bosses, and each boss includes a hole. The releasable wheel assembly further includes an axle passing through the hole of each boss. The axle includes a circumferential groove adjacent to each end of the axle. The releasable wheel assembly still further includes a brace coupled to the base plate and the axle.

In another aspect of the present disclosure, a carry bag for carrying objects carrying objects is disclosed. The carry bag includes a flexible material forming a case. The case includes a zippered opening. The carry bag also includes a bracket affixed to the case at a first lower edge opposite a second lower edge. The bracket includes multiple bosses. The carry bag further includes a stabilizer coupled to the second lower edge of the carry bag. The carry bag still further includes a base plate coupled to the stabilizer and the bracket. The carry bag also includes an axle extending through the multiple bosses. The method further includes a brace coupled to the base plate and the axle.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

FIGS. 7A, 7B, 8A, 8B, 8C, and 8D illustrate examples of a carrying case incorporating a wheel assembly according to aspects of the present disclosure.

DETAILED DESCRIPTION

Figure 1A:
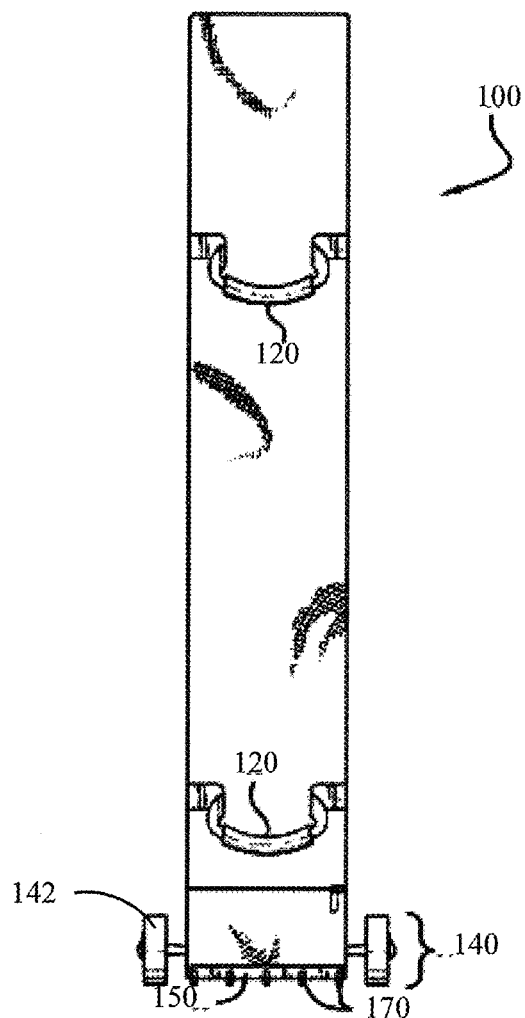
FIG. 1A is a front view of a carrying case incorporating a wheel assembly according to aspects of the present disclosure.

FIG. 1A depicts a case 100 for a collapsible shelter. The case 100 may include handles 120 along with a zippered opening along a top surface or bottom surface, although other closure means are possible. In addition, while shown in generally a rectangular profile, the case 100 may take a number of different shapes and sizes without departing from the present invention. Along a bottom edge of the case 100 is a wheel assembly 140 with wheels 142 that can be affixed to and released from the case 100 as needed, using a release system as described more fully below. It is to be understood that while a two-wheeled assembly 140 is illustrated, the invention can be incorporated into multiple other wheel counts, particularly three and four wheeled variants.

As shown in FIG. 1A, the wheel assembly 140 may include a stabilizer 150 on the opposite side of a vertical portion of a rear bracket (not shown in FIG. 1A) of the wheel assembly 140. The stabilizer 150 may include small legs 170 or other projections that offset the inclination of the carrying case 100 due to the presence of the wheel assembly 140. The stabilizer 150 establishes an optimum angle of inclination of the carry case 100 when the wheel assembly 140 is in place to improve the tilting of the carrying case for rolling. That is, the stabilizer 150 can offer a tilt, such as a 10 to 20 degree tilt, of the carrying case 100. Accordingly, the stabilizer 150 assists in maintaining the carrying case 100 in an upright position while improving a transition from the upright position to a tilted position for moving the carrying case 100. In one configuration, the stabilizer 150 is attached to the case 100 and is not a structure of the wheel assembly 140.

Figure 1B:
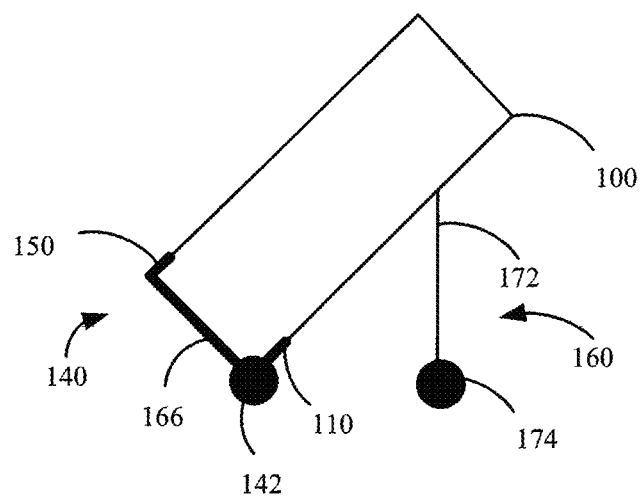
FIG. 1B illustrates an example of a collapsible stabilizer.

For additional stability, a collapsible stabilizer 160 may be defined on a same side as the vertical surface of the wheel assembly 140 (e.g., a side opposite to a side with a stabilizer 150). FIG. 1B illustrates a side view of the carrying case 100 with the collapsible stabilizer 160 according to aspects of the present disclosure. As shown in FIG. 1B a wheel assembly 140 is attached to the carrying case 100. The wheel assembly 140 includes the stabilizer 150, a base 166, multiple wheels 142, and a rear bracket 110. In one configuration, the collapsible stabilizer 160 provides additional stability when the carrying case is in a tilted angle. That is, a leg 172 of the collapsible stabilizer 160 may extend outward and may include one or more wheels 174. The collapsible stabilizer 160 may be coupled to the wheel assembly 140, a bracket of the wheel assembly 140, or another component of the case 100 and/or wheel assembly 140. Furthermore, the collapsible stabilizer 160 may be telescopic such that the leg 172 may be retractable. The example of FIG. 1B is not to scale and is for illustrative purposes.

In one configuration, the collapsible stabilizer is attached to the vertical surface of the rear bracket via attachment rods. The collapsible stabilizer may also be attached to the carrying case. In one configuration, a cross bar is attached to the attachment rods. The collapsible stabilizer may include one or more legs. Each leg may be attached to one or more wheels. Alternatively, two legs may be attached to one wheel. Of course, other wheel and leg combinations are also contemplated. The one or more legs may be attached to the cross bar or may be attached to another structure. In one configuration, when in a collapsed position, the collapsible stabilizer may be retracted to be substantially flush with a vertical surface of the carrying case. The collapsible stabilizer may be detachable.

Figure 2:
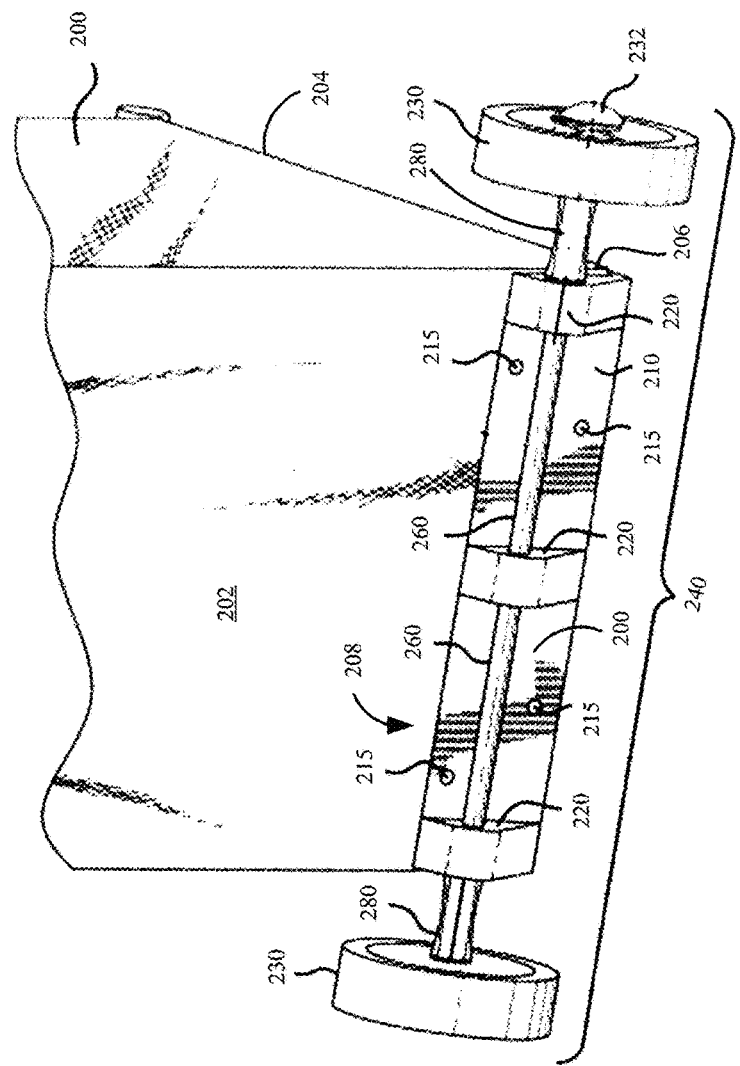
FIG. 2 is an enlarged perspective view of a wheel assembly according to aspects of the present disclosure.

According to aspects of the present disclosure, the wheel assembly includes a rear bracket. The rear bracket may be referred to as an "L"-shaped bracket. FIG. 2 illustrates an example of a vertical portion 210 of the rear bracket 208 of a wheel assembly 240 according to aspects of the present disclosure. As shown in FIG. 2, the vertical portion 210 may be attached to a bottom portion of the case 200 via attachment structures 215 (e.g., fasteners). As shown in FIG. 2, a bottom corner 206 of the case 200 may rest against the vertical portion 210 and horizontal portion of the rear bracket 208. The attachment structures 215 may be rivets, snaps, sewn stitches, ties, or other like structure for attaching the rear bracket 208 to the case 200.

In one configuration, the case 200 is permanently attached to the rear bracket 208. In this configuration, the attachment structures 215 are rivets or other type of connectors with increased strength. The rear bracket 208 may include multiple holes (e.g., eyelets) that permit the rivets to pass through and cooperate with matching holes on the surface of the case 200. For a detachable coupling, the vertical portion 210 may be fastened to the case 200 via an appropriate structure (snaps, locking tabs, etc.).

Although not shown in FIG. 2, the rear bracket includes a horizontal portion attached to the vertical portion 210. In one configuration, a portion of the case 200 attaches to the rear bracket's horizontal portion and vertical portion 210 in a complementary manner. The case 200 includes a bottom horizontal surface 204 and a vertical surface 202. In one configuration, the rear bracket 208 is attached to the case 200 via both the horizontal portion and vertical portion 210 using attachment structures 215.

According to an aspect of the disclosure, the vertical portion 210 is formed with a plurality of bosses 220 to carry the axle 260 of the wheel assembly 240. The bosses 220 may have a triangular profile with a rounded vertex. In one configuration, each boss 220 is equally spaced apart along the vertical portion 210. The bosses 220 may be substantially congruent. Although, each boss 220 may also have a different thickness. Each boss 220 includes a hole to accommodate the axle 260. Each hole may be aligned collinearly with the holes of the other bosses 220. Thus, a single axle 260 can pass through the plurality of bosses 220 in such a manner that the axle 260, when disposed in the bosses 220, is substantially parallel to an edge of the case 200. It is to be understood that the number and shape of the bosses 220 are not critical to the present invention. Rather, the bosses 220 are provided to support the axle 260. The bosses 220 improve the stability of the axle 260 to reduce a wobble. The bosses 220 also protect the axle 260 from damage from the environment.

In one configuration, a spacer 280 is placed over each end of the axle 260. Each spacer 280 may be defined over the axle 260 between each wheel 230 and an edge of the vertical portion 210. As shown in FIG. 2, each spacer 280 is defined between each outermost boss 220 and wheel 230. The spacers 280 reduce transverse displacement of the axle 260 when in use. The spacers 280 may be cylindrical sleeves with an inner diameter that is greater than the diameter of the axle 260. Furthermore, the spacers 280 may be of a predefined length, such that when both spacers 280 are placed on the axle 260, the axle 260 has enough remaining length to support a wheel 230 and a locking end cap 232 at each end of the axle 260. After the spacers 280 are placed on the axle 260, two or more wheels 230 may be placed on the axle 260 for rotational movement thereabout. The spacers 280 center the wheels 230, with respect to the case 200, to improve stability when the case is pulled over both smooth and rough surfaces, such as asphalt, sand, gravel, dirt, etc. That is, the wheels 230 improve the rolling of the case 200 over various surfaces.

Figure 3:
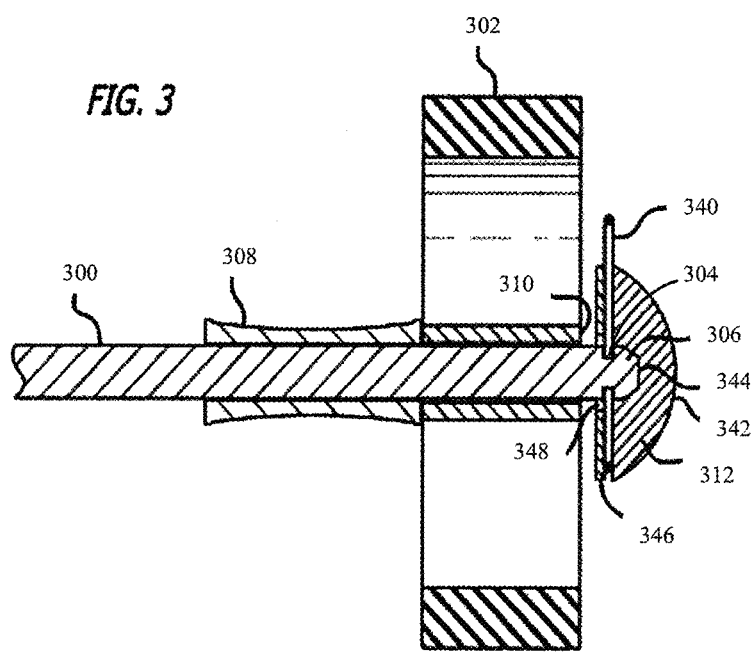
FIG. 3 is a cross-sectional view of a wheel and locking cap according to aspects of the present disclosure

To secure the wheels to the axle, each end of the axle may include a circumferential groove. FIG. 3 illustrates a cross-sectional view of the end of an axle 300 and a wheel 302 according to aspects of the present disclosure. As shown in FIG. 3, the axle 300 includes a circumferential groove 304. The circumferential groove 304 may be at a specific distance, such as approximately one-half to one inch (½"-1"), from the end of the axle 300. The circumferential groove 304 establishes a reduced radial dimension when compared with the adjoining sections of the axle 300. In one configuration, the tips on the end of the axle 300 adjacent the circumferential groove 304 terminate in a frusto-conical element 306 that tapers at the end of the axle 300.

When the wheels 302 and the spacers 308 are both mounted on the axle 300, the circumferential groove 304 and the frusto-conical element 306 are exposed adjacent the wheel hub 310. The locking cap 312 may be placed over the frusto-conical element 306 and the circumferential groove 304 to lock the wheel 302 on the axle 300. With each wheel 302 in place and locked on the axle 300, the case may be rolled over a surface, such as, for example, from a vehicle to a beach or grassy park. In one configuration, when the wheel assembly is no longer needed, one or more of the locking caps 312 can be removed to remove a corresponding wheel 302 and a corresponding spacer 308. The axle 300 may be slid through the bosses of the rear bracket to disassemble a portion of the wheel assembly from the case. When the axle 300 is removed, the case may be stored in a more compact configuration without the wheels 302 taking up space. Additionally, different types of wheels can be exchanged and replaced with little effort by disassembling the axle and exchanging one set of wheels for another.

Figure 5:
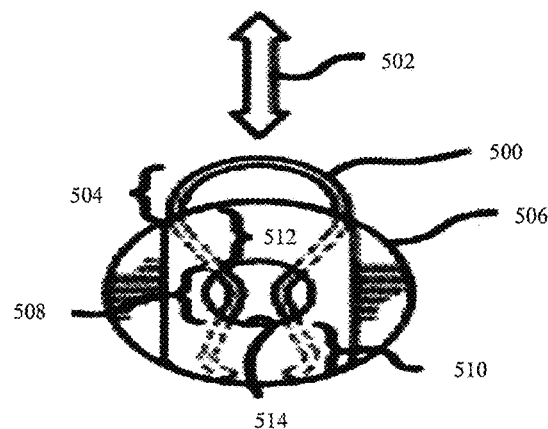
FIG. 5 is a front view, partially in shadow, of a locking cap according to aspects of the present disclosure.

In one configuration, the locking caps 312 engage the axle 300 at the circumferential groove 304 using a two-stage clip 340 having two sections or stages, an interfering part and a non-interfering part (see FIG. 5). When the non-interfering (first stage) part is centered within the locking cap 312, the wire or bar that forms the semi-circular portion does not engage the circumferential groove 304 on the axle 300, permitting the locking cap 312 to slide over (and off) the axle 300.

Furthermore, when the spacers 308 and wheels 302 are mounted on the axle 300, the locking caps 312 may be placed over the frusto-conical elements 306 of the axle 300 such that each clip 340 is aligned over the circumferential groove 304. With the locking cap 312 placed over the frusto-conical elements 306, the clip 340 may be pushed or otherwise urged from the larger, semi-circular portion of the clip 340 over the circumferential groove 304 to the narrower, necked, pinched, or smaller diameter portion of the clip 340 being centered within the locking cap 312 (see FIG. 5). The clip 340 may slip into the circumferential groove 304 and about the axle 300 at its reduced radius, preventing the locking cap 312 from sliding along the axle 300. If the fit between the clip 340 and the groove 304 is sufficiently tight, the clip 340 secures the locking cap 312 onto the axle 300 at the circumferential groove 304 (see FIG. 4).

To disassemble the wheel assembly, the two-stage clip 340 may be pulled or otherwise transitioned from the narrow or smaller diameter portion being centered over the axle 300 to the larger diameter portion (in the direction of arrow 502 of FIG. 5), disengaging the clip 340 from the circumferential groove 304 on the axle 300. In a preferred embodiment, the clip 340 is transitioned by simply pushing an upper portion or a lower portion of the clip 340 that extends out of the locking cap 312 until the proper stage of the clip 340 is engaged or disengaged with the circumferential groove 304 on the axle 300. Once the locking cap 312 is disengaged, the locking cap 312 can be slid off the axle 300 and the spacer 308 and the wheel 302 may be removed. Then, the axle 300 may be removed from the bracket by sliding the axle 300 out of the bosses. The wheels 302, spacers 308, and locking caps 312 may be stored separately from the roller bag/carrying case, conserving space when compared with the assembled configuration. In the present application, the roller bag may be referred to as a carrying case and/or a bag.

As shown in FIG. 3, the locking caps 312 may include a dome-shaped hub cap section 342 to cover the end of the axle 300. The dome-shaped hub cap section 342 may include a frusto-conical aperture 344 sized to receive the mating end of the axle 300 so as to center the locking cap 312 on the axle 300 and establish the correct placement of the clip 340 over the circumferential groove 304 when the mating frusto-conical elements 306 are fully engaged. The locking cap 312 may further include a face plate 346 that bears against an outer portion of the hub 310 of the wheel 302 when the locking cap 312 is locked on the axle 300 to prevent the wheel 302 from drifting on the axle 300. The face plate 346 may include a hole 348 for the axle 300 to pass through and enter the aperture 344 on the hub cap section 342. The face plate 346 and the hub cap 342 may be connected in such a manner that the clip 340 enters the path of the axle 300 as it moves from the face plate 346 to the hub cap 342. This can be achieved, for example, by arcuate connectors (not shown) above and below the hole 348 in the face plate 346 that connect the face plate 346 to the hub cap 342. The arcuate connectors may include gaps between the clip's narrow section to intercede and engage the circumferential groove 304 when needed to lock the end cap 312 on the axle 300.

Figure 4:
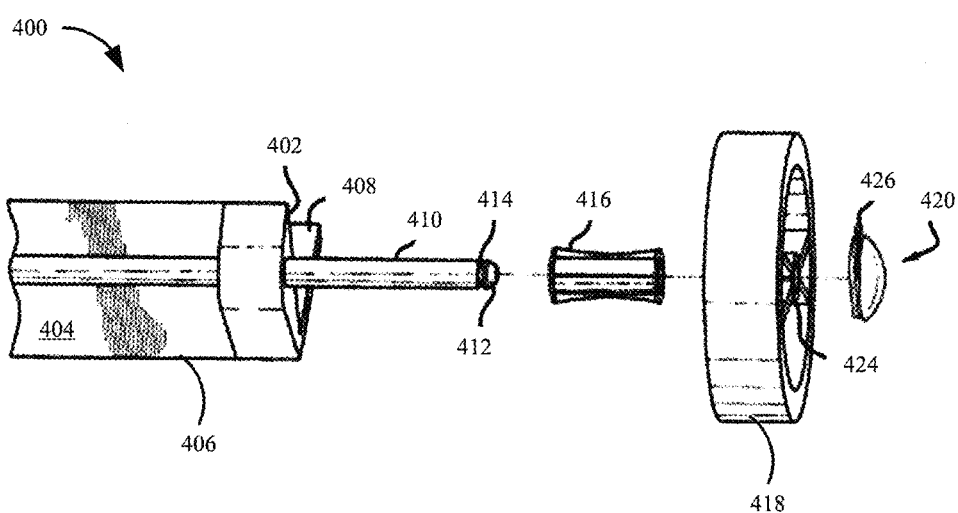
FIG. 4 is an exploded view of a wheel assembly according to aspects of the present disclosure.

FIG. 4 illustrates an example of portions of the wheel assembly 400 that have been disassembled. As shown in FIG. 4, the axle 410 passes through a hole of a boss 402. As previously discussed, the boss 402 may be defined on a vertical portion 404 of a rear bracket 406. The rear bracket 406 further includes a horizontal portion 408. The axle 410 includes a circumferential groove 414 and a frusto-conical element 412. A spacer 416 may be placed over the axle 410, such that the spacer 416 is defined between the outermost boss 402 and the wheel 418. An end cap 420 may engage the end of the axle 410 by securing the end cap 420 to the axle 410 via a pin 426 that engages the groove 414. The end cap 420 is placed adjacent to the wheel hub 424.

In one configuration, the clip on the locking cap is a metal rod that is bent or otherwise formed into the two-stage clip. Still, the clip may take other forms, such as a plate having a cutout of the shape needed to engage and disengage the axle. The clip may be held between the dome-shaped hub cap and the face plate. Furthermore, the clip may be linearly moved from a first position (e.g., disengaged) to a second position (e.g., engaged). Nonetheless, the clip may be otherwise captured between the two portions of the locking cap.

FIG. 5 illustrates an example of a clip 500 according to aspects of the present disclosure. In one configuration, when the clip 500 is in the engaged position, the upper section 504 of the clip 500 protrudes beyond the face plate (not shown in FIG. 5) and the end cap 506. A user may push down on the upper section 504 of the clip 500 in a direction of an arrow 502 to force a narrow portion 508 of the clip 500 off the circumferential groove of the axle, thereby disengaging the clip 500 from the axle. When the upper section 504 is pushed down, the lower portion 510 of the clip 500 may be exposed on a side of the end cap 506 that is opposite to the upper portion 504. In the present application, the end cap may be referred to as a locking cap or a cap. Furthermore, a larger diameter section 512 may be about the axle. As shown in FIG. 5, the axle would pass through a hole 514 of the cap 506.

Additionally, the clip 500 may be engaged by pushing the lower section 510 in a direction 502 so that the clip 500 engages the axle at the circumferential groove, thereby locking the cap 506 while exposing the upper section 504 on a side of the cap 506 that is opposite to the lower portion 510. In this manner, the cap 506 may be engaged and disengaged with the axle by manually pushing on the exposed portion of the clip 500. A fit between the clip 500 and the circumferential groove should be of a sufficient character to engage the clip 500. When the clip 500 is engaged with the axle, the likelihood of the cap 506 being disengaged when the case is rolled over rough or uneven terrain is reduced.

Figure 6:
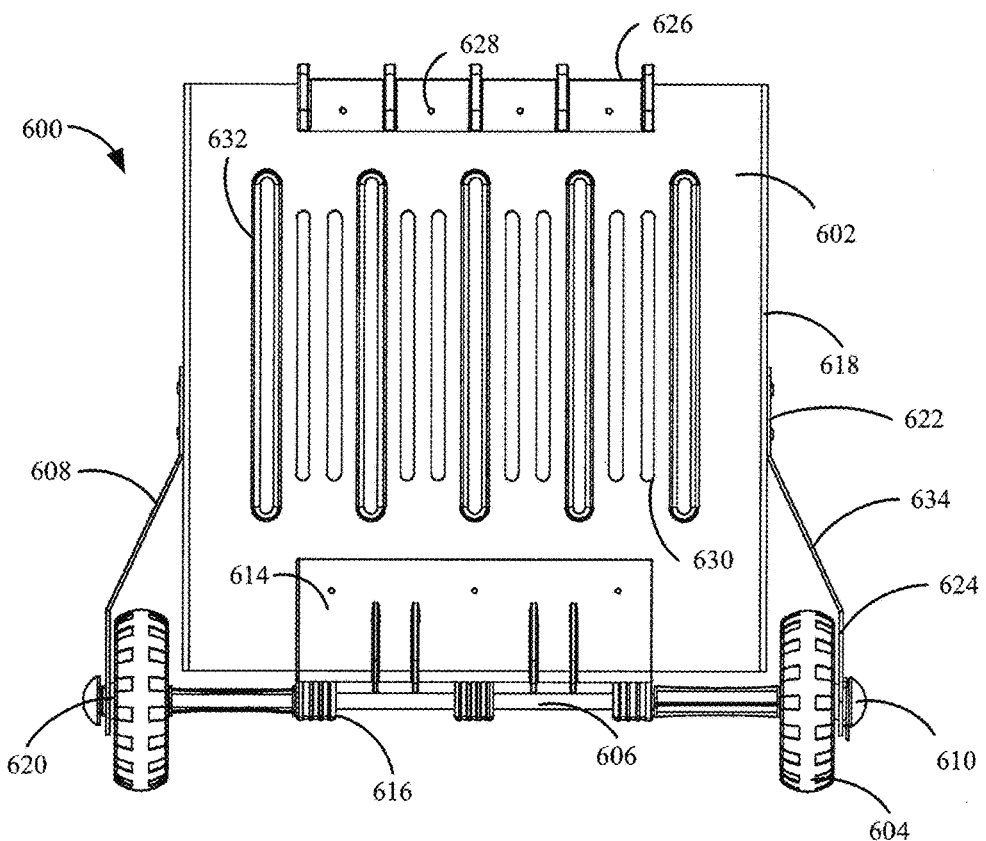
FIG. 6 illustrates an example of a bottom-up view of a wheel assembly according to aspects of the present disclosure.

In one configuration, a brace is provided to improve the stability to the wheel assembly. FIG. 6 illustrates an example of a bottom-up view of a wheel assembly 600 with stabilizing braces 608 according to an aspect of the present disclosure. As shown in FIG. 6, the wheel assembly 600 includes a base 602, wheels 604, an axle 606, and braces 608. The base 602 engages with a horizontal portion 614 of the bottom of the rear bracket. The base 602 also engages with a stabilizer 626. The rear bracket and the stabilizer 626 may be a different material than the base 602. For example, the base 602 may be a type of metal and the rear bracket and the stabilizer 626 may be a type of plastic, carbon fiber, or other type of non-metal material. Of course, the base 602, rear bracket, and stabilizer 626 may be the same type of material.

Figure 9:
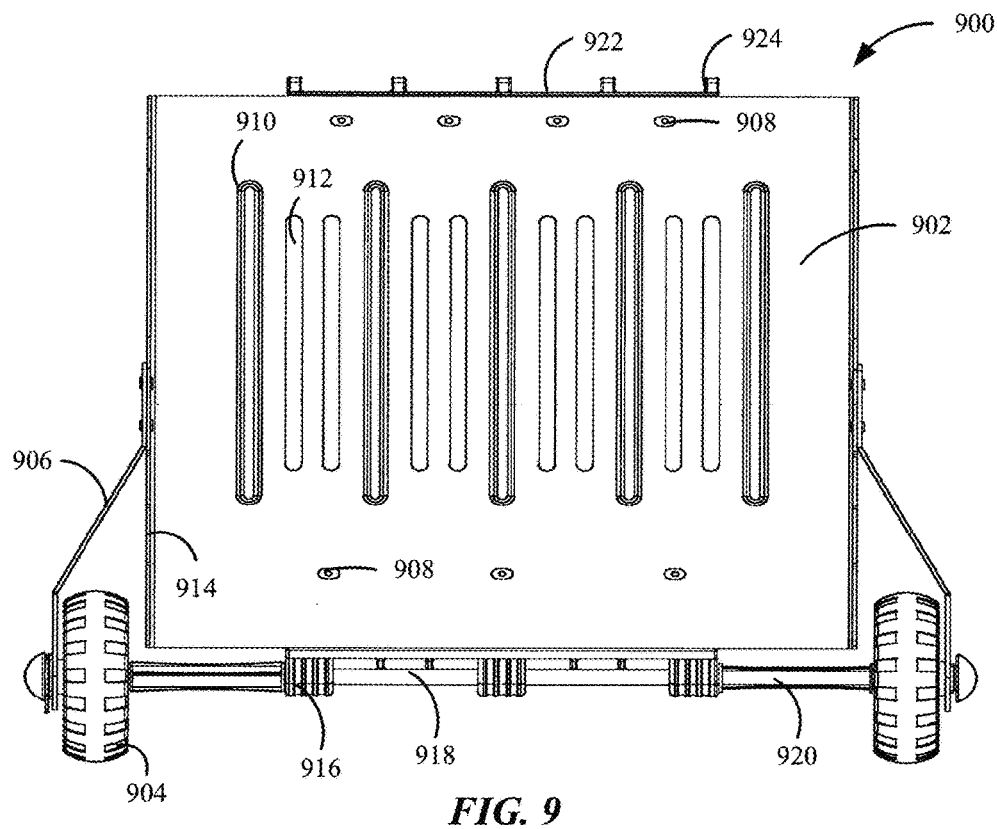
FIGS. 9, 10, 11A, 11B, and 12 illustrate examples of a wheel assembly according to aspects of the present disclosure.

As previously discussed, the rear bracket is attached to a first bottom edge of the bag via an attaching structure, such as rivets, snaps, sewn stitches, ties, or other attaching structure. The stabilizer 626 may also be attached to a second bottom edge, opposite of the first bottom edge, of the bag via an attaching structure, such as rivets, snaps, sewn stitches, ties, or other attaching structure. The bag may be attached to the stabilizer 626 and a horizontal portion 614 of the bottom of the rear bracket via eyelets 628. The eyelets 628 may also be used for attaching structures that respectively couple the stabilizer 626 and the rear bracket to the base 602. In one configuration, the first bottom edge of the roller bag rests on top of the base 602. The top of the base 602 is a side that is opposite to the side shown in FIG. 6. An example of the top of the base 602 is shown in FIG. 9. In the present application, a case (e.g., carrying case) may be referred to as a roller bag.

As shown in FIG. 6, a first end 622 of the brace 608 is coupled to a side wall 618 of the base 602 and a second end 624 of the brace 608 is coupled with the axle 606. Specifically, the brace 608 may be coupled to the axle 606 and secured between a hub of the wheel 604 and a locking end cap 610. A washer 620 may be defined between the hub of the wheel 604 and an end of the brace 608. Furthermore, the wheel 604 may be defined in a space between side wall 618 and the brace 608. In one configuration, a middle portion 634 of the brace 608 tapers outwards from the first end 622 to the second end 624. The tapering provides a space for the wheel 604.

As previously discussed, the axle 606 may be stabilized by the bosses 616. The braces 608 may be added to the wheel assembly 600 to further improve the stability of the axle 606 by reducing a jitter of the axle 606. The improved stability of the axle 606 improves the stability of the wheels 604, thereby improving the stability of the case when the case is carried over various terrains.

As shown in FIG. 6, dimples 632 may be defined in the base 602. The dimples 632 may also be referred to as pressing grooves, beads, or ribs. The dimples 632 may be substantially equally distanced from each other and may be of similar lengths. The dimples 632 increase the strength of the base 602. That is, each dimple 632 compounds the strength of the base 602. Furthermore, the dimples 632 may add to the aesthetics of the base 602.

In one configuration, the base 602 also includes slotted holes 630. The slotted holes 630 may mitigate expansion of the base 602 due to changes in temperature (e.g., environment) and may reduce the weight of the base 602. The base 602 may also be referred to as a plate or a base plate. The slotted holes 630 may also add to the aesthetics of the base 602. The slotted holes 630 may be of similar length. As shown in FIG. 6, two slotted holes 630 are defined between each dimple 632. Furthermore, the length of the dimples 632 may be greater than the length of the slotted holes 630. Aspects of the present disclosure are not limited to the number of dimples 632 and slotted holes 630 shown in FIG. 6, more or fewer dimples 632 and/or slotted holes 630 may be defined. Furthermore, the lengths of the dimples 632 and/or slotted holes 630 may be different from the lengths illustrated in FIG. 6.

Figure 7A:
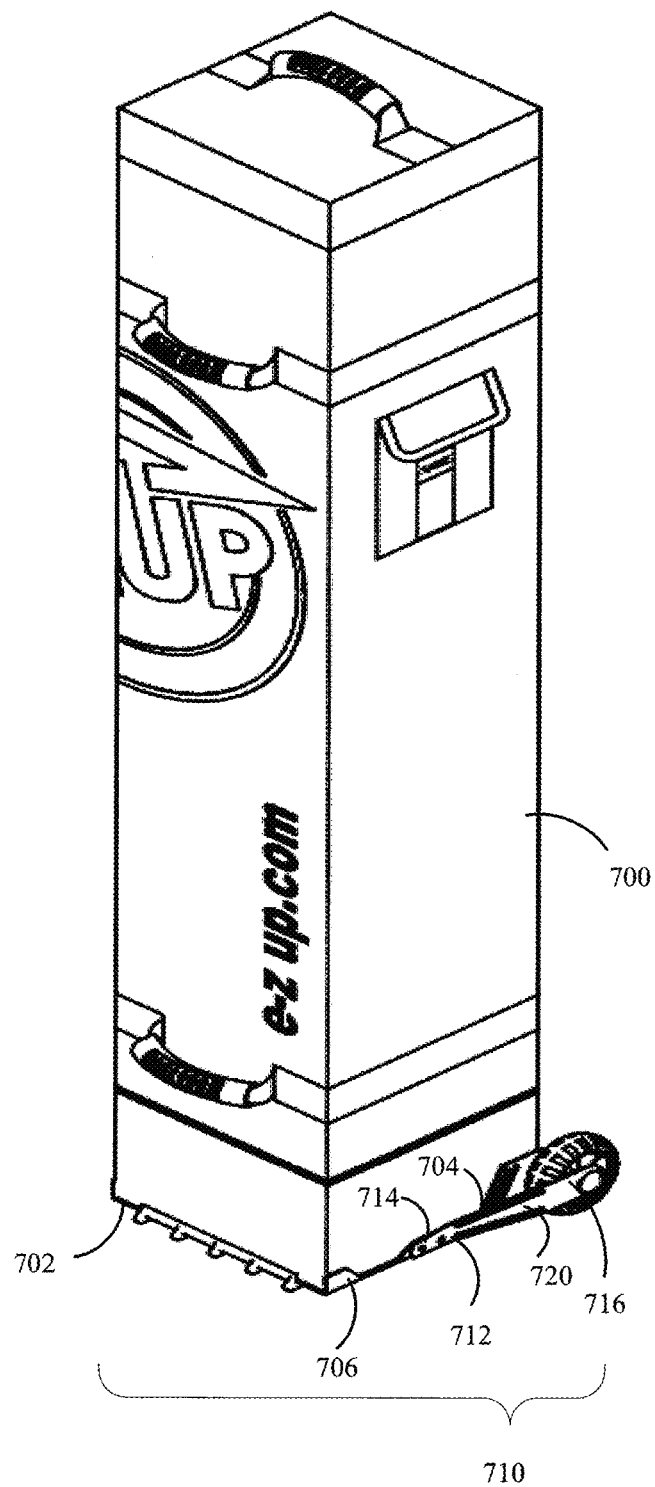

As previously discussed, the base of the wheel axle assembly may be used to carry a bag (e.g., case) for a portable shelter or other object. The base and/or rear bracket may be attached to the bag via one or more types of structures. FIG. 7A illustrates an example of a bag 700 disposed on a base 702 of a wheel assembly 710 according to aspects of the present disclosure. As shown in FIG. 7A, the roller bag 700 is placed on top of the base 702. In one configuration, the base 702 is attached to the bag 700 via one or more types of structures.

Additionally, a stabilizing brace 704 is defined to be connected to a side wall 706 of the base 702 and the end of an axle. That is, a first end 712 of the brace 704 is attached to the side wall 706 of the base 702 via an attaching structure 714, such as bolts, rivets, fasteners, and/or other attaching structures. A second end 716 of the brace 704 may be attached to the axle (not shown). The first end 712 and the second end 716 may be substantially parallel to the side wall 706 of the base 702. As previously discussed, the end of the axle may be covered by an end cap. The second end 716 may include a hole (not shown) for the axle to pass through. The second end 716 is secured between the end cap and the wheel hub. In one configuration, the width of the first end 712 is less than the width of the second end 716. The widths may be different to accommodate the different widths of the side wall and axle. A middle portion 720 tapers outward between the first end 712 and the second end 716. The width of the middle portion 720 expands to accommodate the different widths of the first end 712 and the second end 716.

Figure 7B:
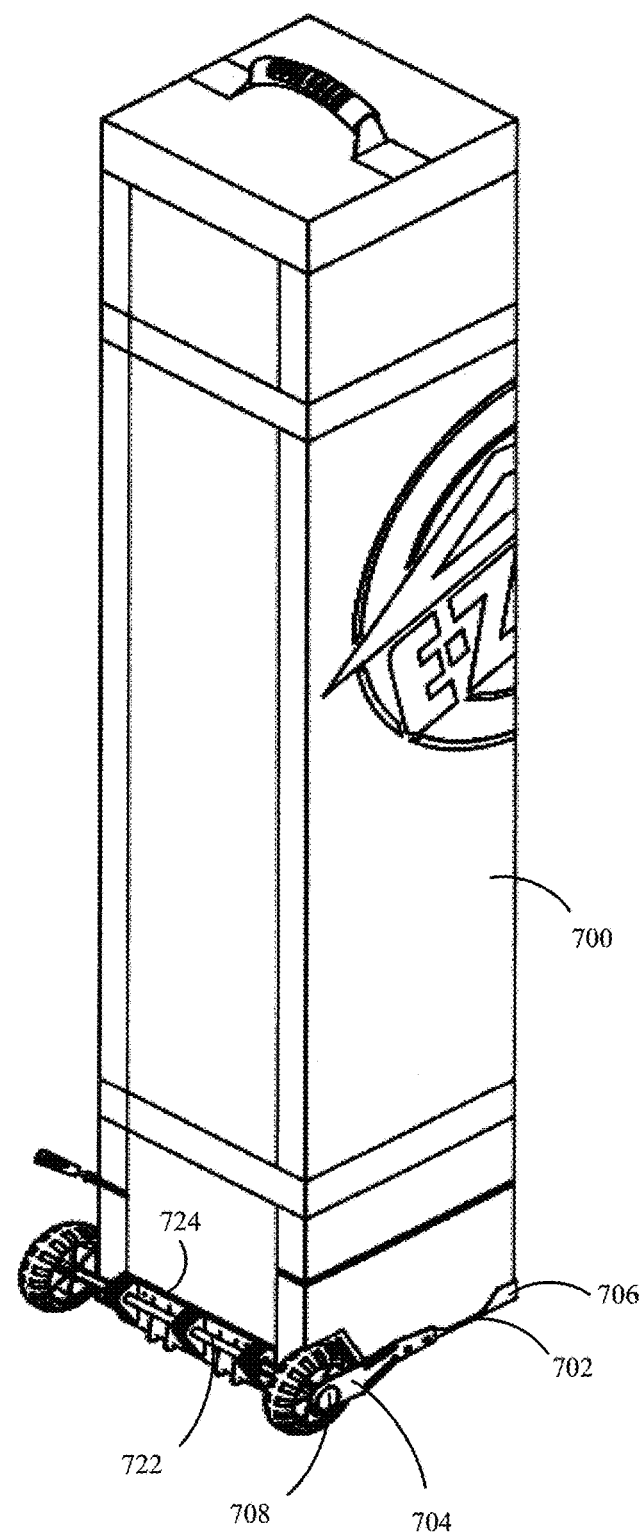

FIG. 7B illustrates an example of a bag 700 placed on the base 702 of a wheel assembly according to aspects of the present disclosure. As shown in FIG. 7B, the bottom of the bag 700 is connected to a top of the base 702. The bag 700 is also connected to a vertical portion of the rear bracket 724. The brace 704 is defined to be connected to a side wall 706 of the base 702 and the end of an axle 722. The end cap 708 is placed at the end of the axle 722.

FIG. 8A illustrates an example of a back view of bag 800 disposed on top of a base of a wheel assembly 820 according to an aspect of the present disclosure. As shown in FIG. 8A, a vertical surface 804 of the rear bracket of the wheel assembly may be fastened to the roller bag 800. Additionally, braces 806 may flare out from a side wall of the base (not shown). As previously discussed, a wheel may be defined between the brace 806 and the side wall of the base.

FIGS. 8B and 8D illustrate examples of a side view of roller bag 800 placed on top of a base of a wheel assembly according to an aspect of the present disclosure. In one configuration, a base 808 of the wheel assembly is fastened to the roller bag 800. Additionally, braces 806 may be connected to a side wall 812 of the base 808. As shown in FIGS. 8B and 8D, a first end 816 of the brace 806 is attached to the side wall 812 of the base 808. A middle portion 818 of the brace 806 may be defined at an angle between the first end 816 and a second end 814 of the brace 806. In one configuration, a hole 810 is defined at a second end 814 of the brace 806. The axle (not shown) may pass through the hole 810 of the brace 806.

FIG. 8C illustrates an example of a front view of bag 800 placed on top of a base of a wheel assembly according to an aspect of the present disclosure. As shown in FIG. 8C, a stabilizer 802 may be defined in front of the roller bag 800. Additionally, braces 806 may flare out from a side wall of the base (not shown). As previously discussed, a wheel may be defined between the brace 806 and the side wall of the base.

FIG. 9 illustrates an example of a top-down view of a wheel assembly 900 according to an aspect of the present disclosure. As shown in FIG. 9, the wheel assembly 900 includes a base 902 and braces 906. A bottom of a bag (not shown) rests on top of the base 902. The base 902 may include eyelets 908 for receiving an attaching structure, such as bolts, rivets, fasteners, and/or other structures for fastening the base 902 to the case. The eyelets 908 may also be used for attaching the base 902 to the stabilizer or a horizontal portion of a rear bracket. In one configuration, dimples 910 may be defined in the base 902. The dimples 910 may also be referred to as pressing grooves, beads, or ribs. The dimples 910 may be substantially equally distanced from each other and may be of similar lengths. The dimples 910 increase the strength of the base 902. That is, each dimple 910 compounds the strength of the base 902. Furthermore, the dimples 910 may add to the aesthetics of the base 902. In one configuration, the base 902 also includes slotted holes 912. The slotted holes 912 may mitigate expansion of the base 902 due to changes in temperature (e.g., environment). The slotted holes 912 may also add to the aesthetics of the base 902.

The base 902 is a top portion of the wheel assembly 600 as shown in FIG. 6. As shown in FIG. 9, wheels 904 are defined in a space between a side wall 914 of the base 902 and the brace 906. The wheel assembly 900 may also include bosses 916 to carry an axle 918. Spacers 920 may be defined between each outermost boss 916 and an adjacent wheel 904. The stabilizer 922 is also visible from the top-down view of FIG. 9. The stabilizer 922 may include small legs 924 that extend outward from the base 902 and stabilizer 922. The small legs 924 may prevent damage to the base 902 from colliding with other objects. The small legs 924 (e.g., teeth) may also offset the inclination of the bag due to the presence of the wheel assembly 900.

Figure 10:
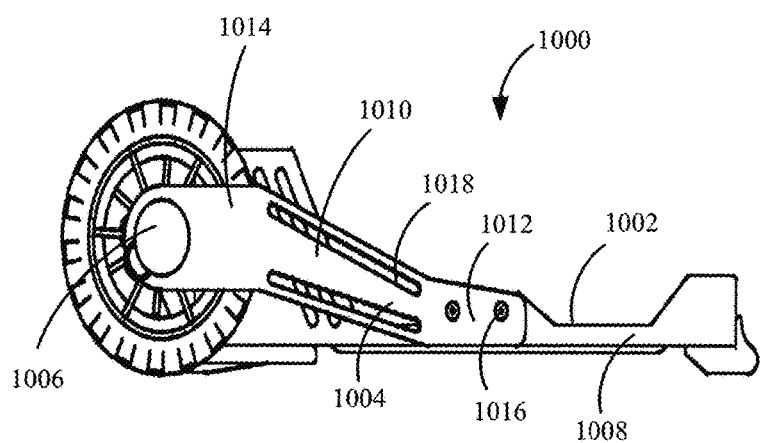

FIG. 10 illustrates an example of a side view of a wheel assembly 1000 according to an aspect of the present disclosure. As shown in FIG. 10, a base 1002 of the wheel assembly 1000 may defined to hold a bag (e.g., roller bag). Additionally, braces 1004 may be connected to a side wall 1008 of the base 1002. The side wall 1008 of the base 1002 may be substantially perpendicular to the horizontal base 1002. A middle portion 1010 of brace 1004 may be defined at an angle between a first end 1012 of the brace 1004 and a second end 1014 of brace 1004. Slots 1018 may be defined in the middle portion 1010 of the brace 1004. The slots 1018 may mitigate expansion/contraction due to changes in temperature and may reduce the weight of the brace 1004. The slots 1018 may also increase the aesthetics of the wheel assembly 1000.

The axle (not shown) passes through a hole (not shown) of the second end 1014 of the brace 1004. The end cap 1006 is attached to the end of the axle. The first end 1012 of the brace 1004 may be connected to the side wall 1008 of the base 1002 via attaching structures 1016, such as bolts, rivets, fasteners, and/or other structures for fastening. As previously discussed, the brace 1004 provides additional stability to the wheel assembly 1000 and a roller bag.

Figure 11A:
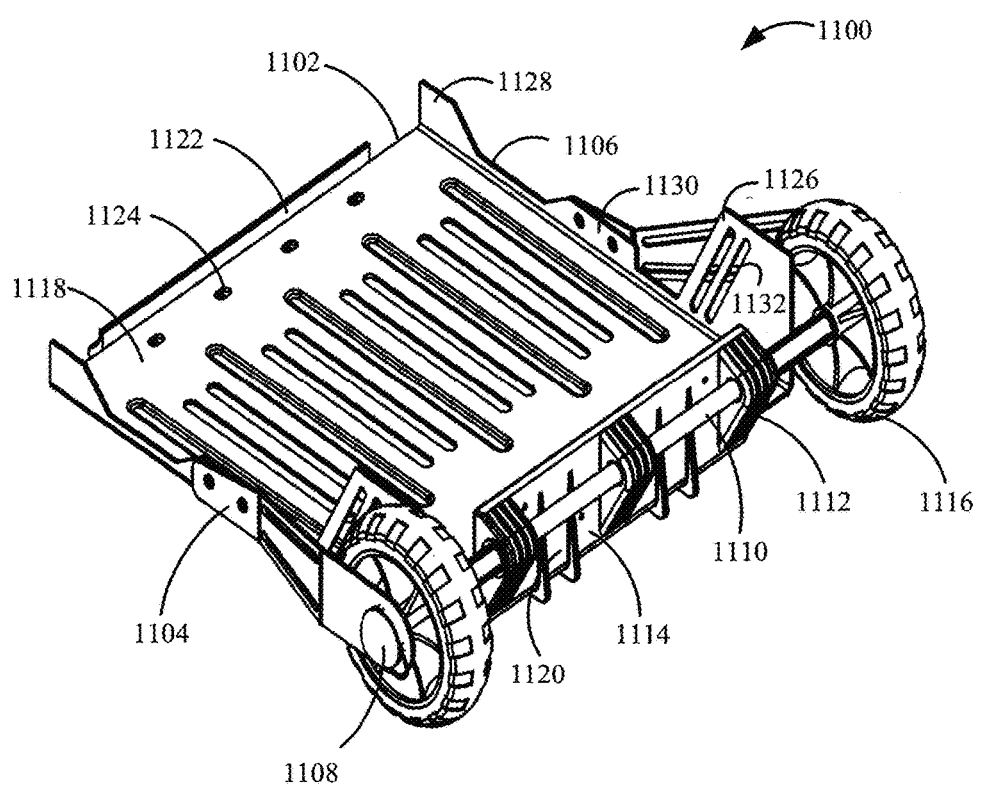

FIG. 11A illustrates an example of a wheel assembly 1100 according to an aspect of the present disclosure. As shown in FIG. 11A, a base 1102 of the wheel assembly 1100 is provided to hold a bag. That is, a bag, such as a bag for holding a collapsible canopy, may be attached to the base 1102. Additionally, braces 1104 may be connected to a side wall 1106 of the base 1102. The side wall 1106 of the base 1102 may be perpendicular to the horizontal portion 1118 of the base 1102. A portion of the brace 1104 may be defined at an angle between the side wall 1106 of the base 1102 and the end cap 1108 of an axle 1110.

The wheel assembly 1100 may also include bosses 1112 to carry an axle 1110 of the wheel assembly 1100. As previously discussed, a rear bracket 1120 that is coupled to the base 1102 includes a vertical portion 1114 and a horizontal portion (not shown). The rear bracket 1120 may be attached to a bag via attaching structures. A stabilizer 1122 may be defined at a front of the base 1102. The stabilizer 1122 may be attached to the bag via attaching structures through the eyelets 1124. As shown in FIG. 11A, wheels 1116 may be defined on the axle 1110 between a brace 1104 and a side wall 1106 of the base 1102.

In one configuration, a back portion 1126 of the side wall 1106 has a greater height than a front portion 1128. A brace attaching portion 1130 of the side wall 1106 between the back portion 1126 and the front portion 1128 has a height that is less than both the back portion 1126 and the front portion 1128. The brace attaching portion 1130 extends upwards to provide an area to attach the side wall 1106 with the brace 1104. Slots 1132 may be defined in the back portion 1126 of the brace 1104. The slots 1132 may mitigate expansion/contraction due to changes in temperature and may reduce the weight of the brace side wall 1106. The slots 1132 may also increase the aesthetics of the wheel assembly 1000.

Figure 11B:
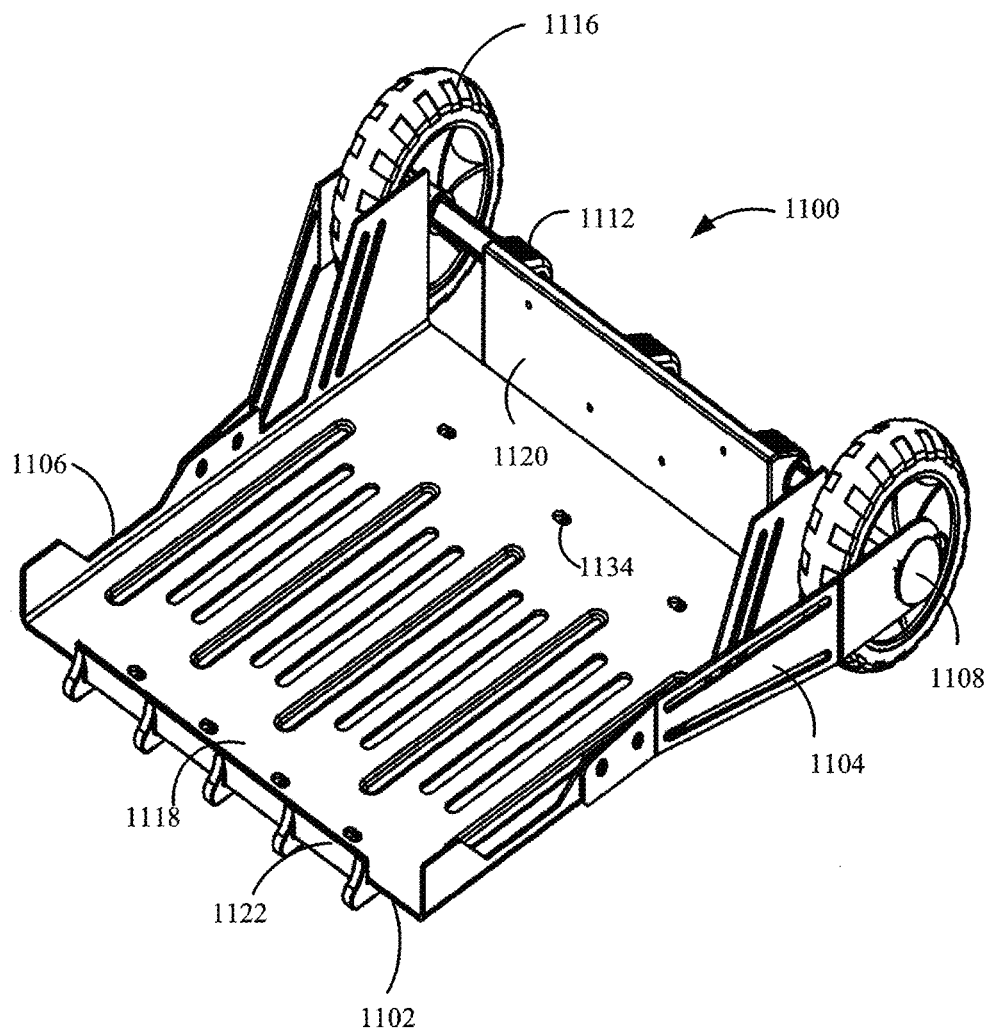

FIG. 11B illustrates an example of the wheel assembly 1100 according to an aspect of the present disclosure. As shown in FIG. 11B, the base 1102 of the wheel assembly 1100 may be provided to hold a bag. Additionally, the braces 1104 may be connected to the side wall 1106 of the base 1102. The side wall 1106 of the base 1102 may be perpendicular to the horizontal portion 1118 of the base 1102. A portion of the brace 1104 may be defined at an angle between the side wall 1106 of the base 1102 and the end cap 1108 of an axle 1110.

The wheel assembly 1100 may also include bosses 1112 to carry an axle of the wheel assembly 1100. As previously discussed, the rear bracket 1120 includes a horizontal portion (not shown) and a vertical portion 1114. The rear bracket 1120 may be attached to the bag through both the horizontal portion and the vertical surface 1114 using attaching structures. The horizontal portion of the rear bracket 1120 may be attached to the bag via eyelets 1134. As shown in FIG. 11B, wheels 1116 may be defined on the axle between a brace 1104 and the side wall 1106 of the base 1102. Furthermore, a stabilizer 1122 may be defined on the opposite side of the vertical surface 1114.

Figure 12:
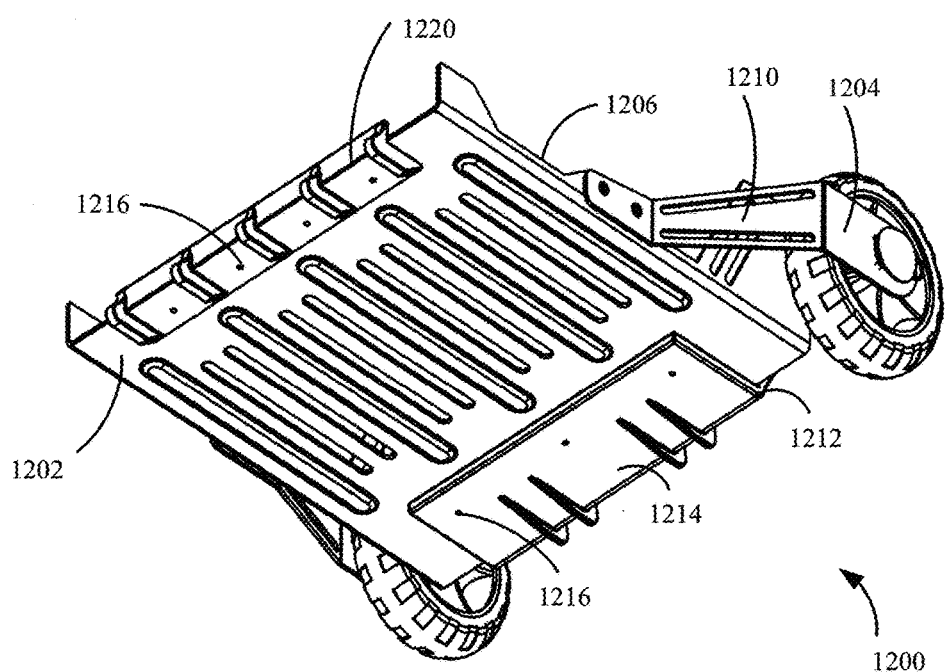

FIG. 12 illustrates an example of a wheel assembly 1200 according to an aspect of the present disclosure. As shown in FIG. 12, a base 1202 of the wheel assembly 1200 is provided to hold a bag. The bag may be placed on top of the portion of the base 1202 that is opposite to a side of the base 1202 shown in FIG. 12. The side of the base 1202 shown in FIG. 12 may be referred to as the bottom side of the base. Additionally, braces 1204 may be connected to a side wall 1206 of the base 1202. As shown in FIG. 12, a middle portion 1210 of the brace 1204 extends outwards from the side wall 1206 of the base 1202.

As previously discussed, a rear bracket 1212 may be coupled to the base 1202. The rear bracket 1212 includes a vertical surface (not shown) and a horizontal portion 1214. The horizontal portion 1214 may be attached to the bag via attaching structures. The attaching structures may be attached through the eyelets 1216. The horizontal portion 1214 may also be attached to the base 1202 with attaching structures through the eyelets 1216. Furthermore, a stabilizer 1220 may be defined on the opposite side of a vertical surface. The stabilizer 1220 may be attached to the bag via attaching structures. The attaching structures may be attached through the eyelets 1216. The stabilizer 1220 may also be attached to the base 1202 with attaching structures through the eyelets 1216.

The invention may be embodied in other forms without departure from the benefits and characteristics described. The embodiments described therefore are to be considered in all respects as illustrative and not restrictive. Although the present invention has been described in terms of certain preferred embodiments, other embodiments that are apparent to those of ordinary skill in the art are also within the scope of the invention.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A releasable wheel assembly comprising:
a base plate;
a bracket coupled to the base plate, the bracket comprising a plurality of bosses, each boss comprising a hole;
an axle passing through the hole of each boss, the axle including a circumferential groove adjacent to each end of the axle; and
a brace coupled to the base plate and the axle.

2. The releasable wheel assembly of claim 1, in which the brace comprises a first portion, a second portion, and a third portion.

3. The releasable wheel assembly of claim 2, in which:
the first portion is coupled to the base plate;
the third portion is coupled to the axle; and
the second portion extends between the first portion and the second portion at an upward angle.

4. The releasable wheel assembly of claim 3, in which the second portion further extends at an outward angle in relation to the base plate, such that the first portion is on a different plane in comparison to a plane of the third portion.

5. The releasable wheel assembly of claim 4, in which a height of the first portion is less than a height of the third portion.

6. The releasable wheel assembly of claim 3, in which the third portion comprises a hole for receiving the axle.

7. The releasable wheel assembly of claim 1, wherein the brace is coupled to a sidewall of the base plate.

8. The releasable wheel assembly of claim 1, further comprising:
a first plurality of wheels on the axle, the axle extending through a hub on each wheel; and
a plurality of locking caps, each locking cap fitting over an end of the axle, and each locking cap comprising a clip for engaging the axle at the circumferential groove.

9. The releasable wheel assembly of claim 8, in which the locking cap comprises a hub cap and a face plate, and the clip is disposed between the hub cap and the face plate.

10. The releasable wheel assembly of claim 8, in which the brace is defined between a wheel of the first plurality of wheels and a locking cap of the plurality of locking caps.

11. The releasable wheel assembly of claim 8, further comprising a second plurality of wheels that are disposed on the axle adjacent to the first plurality of wheels.

12. A carry bag for carrying objects, the carry bag comprising:
a flexible material forming a case, including a zippered opening;
a bracket affixed to the case at a first lower edge opposite a second lower edge, the bracket including a plurality of bosses;
a stabilizer coupled to the second lower edge of the carry bag;
a base plate coupled to the stabilizer and the bracket;
an axle extending through the plurality of bosses; and
a brace coupled to the base plate and the axle.

13. The carry bag of claim 12, in which the brace is coupled to a sidewall of the base plate.

14. The carry bag of claim 12, in which the brace comprises a first portion, a second portion, and a third portion.

15. The carry bag of claim 14, in which:
the first portion is coupled to the base plate;
the third portion is coupled to the axle; and
the second portion extends between the first portion and the second portion at an upward angle.

16. The carry bag of claim 15, in which the second portion further extends at an outward angle in relation to the base plate, such that the first portion is on a different plane in comparison to a plane of the third portion.

17. The carry bag of claim 15, in which a height of the first portion is less than a height of the third portion.

18. The carry bag of claim 15, in which the third portion comprises a hole for receiving the axle.

19. The carry bag of claim 12, further comprising:
a plurality of spacers on opposite ends of the axle;
a plurality of wheels on the axle, each wheel adjacent to one of the plurality of spacers; and
a plurality of locking caps, each locking cap adjacent to a wheel of the plurality of wheels, and each locking cap comprising a clip to engage a circumferential groove on the axle.

20. The carry bag of claim 19, in which the brace is defined between a wheel of the plurality of wheels and a locking cap of the plurality of locking caps.

* * * * *